(12) United States Patent  
Bitar et al.

(10) Patent No.: US 9,326,242 B1  
(45) Date of Patent: Apr. 26, 2016

(54) REDUCING POWER CONSUMPTION ON LOCATION REFERENCE DEVICES

(71) Applicant: Verizon Patent and Licensing Inc., Arlington, VA (US)

(72) Inventors: Nabil N. Bitar, Acton, MA (US); Gareth P. DeKlerk, East Windsor, NJ (US); Lawrence Richard Rau, Dublin, NH (US); Kumar K. Vishwanathan, Acton, MA (US); Matthew Santaiti, Basking Ridge, NJ (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 0 days.

(21) Appl. No.: 14/508,377

(22) Filed: Oct. 7, 2014

(51) Int. Cl.
*H04W 24/00* (2009.01)
*H04W 52/02* (2009.01)
*H04W 4/02* (2009.01)
*H04W 84/04* (2009.01)

(52) U.S. Cl.
CPC .......... *H04W 52/0225* (2013.01); *H04W 4/023* (2013.01); *H04W 84/042* (2013.01)

(58) Field of Classification Search
CPC ....... H04W 64/00; H04W 4/02; H04W 8/245; H04M 1/72519
USPC .......................... 455/456.2, 456.6, 418, 550.1
See application file for complete search history.

(56) References Cited

U.S. PATENT DOCUMENTS

| | | | | |
|---|---|---|---|---|
| 2013/0176869 A1* | 7/2013 | Finlow-Bates | .... | H04W 52/0254 370/252 |
| 2013/0190018 A1* | 7/2013 | Mathews | ............... | H04W 4/023 455/456.6 |
| 2013/0331127 A1* | 12/2013 | Sabatelli | ............... | H04W 4/021 455/456.3 |
| 2014/0315571 A1* | 10/2014 | Saari | ..................... | H04W 64/00 455/456.1 |
| 2015/0050947 A1* | 2/2015 | Wirola | .................. | G01S 5/0252 455/456.1 |
| 2015/0148056 A1* | 5/2015 | Austin | ................ | H04W 64/006 455/456.1 |
| 2015/0161834 A1* | 6/2015 | Spahl | ................. | G07C 9/00111 340/5.61 |
| 2015/0327016 A1* | 11/2015 | Shill | ..................... | H04W 4/023 455/456.1 |
| 2015/0358767 A1* | 12/2015 | Luna | ....................... | H04W 4/02 455/456.1 |

* cited by examiner

*Primary Examiner* — Danh Le

(57) ABSTRACT

A device may request location information for a location reference device (LRD); receive, based on the request, the location information for the LRD via a cellular network connection; transmit, via the cellular network, an instruction to direct the LRD to activate a non-cellular radio on the LRD; receive wireless signals outputted via the non-cellular radio; determine a distance between the user device and the LRD based on a strength of the wireless signals received by the user device; and audibly or visually indicate, by the user device, the determined distance between the user device and the LRD.

20 Claims, 15 Drawing Sheets

REDUCING POWER CONSUMPTION ON LOCATION REFERENCE DEVICES

BACKGROUND

Location reference devices may include "object tracker" devices that are designed to wirelessly report the location of a host device, person, and/or animal. A location reference device may be implemented as, for example, a key chain, a dongle, a wearable computing device (e.g., watches, collars, etc.), and/or another device. Location reference devices may be attached to an object via mounting hardware, adhesives, straps, and/or some via some other technique.

A location reference device may include hardware to determine the location of the location reference device and report the location, such as to a smart phone of a user. The location reference device hardware may include radios, such as cellular radios and radios used to implement short range wireless networks. Such hardware may consume a substantial amount of battery power. Some of the hardware may be continuously powered on so that the location of the location reference device may be traceable at any time. The battery in some location reference devices may be non-replaceable, or difficult to replace, making battery conservation particularly important.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may control hardware on a location reference device (LRD) to reduce battery consumption by the LRD. For example, certain low-powered hardware (such as Bluetooth Low Emissions (BLE) hardware) on the LRD may be powered off by default (e.g., hardware that would ordinarily remain powered on by default). The low-powered hardware may be powered only when needed, and then powered off when no longer needed, thereby substantially reducing battery power consumed by the LRD.

A user device, such as a smart phone carried by a person who wishes to locate the LRD, may be used to initially determine a "coarse" location of the LRD via global position system (GPS) hardware on the LRD. The low-powered hardware may be powered on when the user device travels to within a low-powered communications range of the LRD (e.g., a range in which the user device may detect wireless signals output by the low-powered hardware). The low-powered hardware may be powered on in order for the user device to obtain a "fine" location of the LRD. The low-powered hardware may then be powered off when the location of the LRD is no longer needed (e.g., when a user has indicated that the LRD has been found). As a result, the low-powered hardware may be powered on only when needed, thereby substantially reducing battery power consumed by the LRD.

In some implementations, hardware on the LRD may be controlled, without user interaction, based on the proximity of the LRD to the user device. For example, when the LRD is within a particular range of the user device, the LRD may communicate with the user device using "close-range" or "low-powered" communications hardware, such as via Bluetooth® or another short range communication technology. The user device may determine the location of the LRD using the low-powered communications hardware. Further, when in range of the user device via the close-range communication hardware, the LRD may disable "high-powered" location identification hardware (e.g., GPS hardware) and/or "high-powered" communications hardware (e.g., a cellular radio), thereby reducing power consumption by the LRD.

As such, the LRD may refrain from using high-powered hardware when the LRD is within a low-powered communications range of the user device (e.g., a range in which the user device may communicate with the LRD using low-powered communications hardware). The high-powered location identification hardware and the high-powered communications hardware may be re-activated by the LRD when the user device is no longer within a lower-powered communications range, so that the user device may continue to track the location of the LRD.

Figure 1:
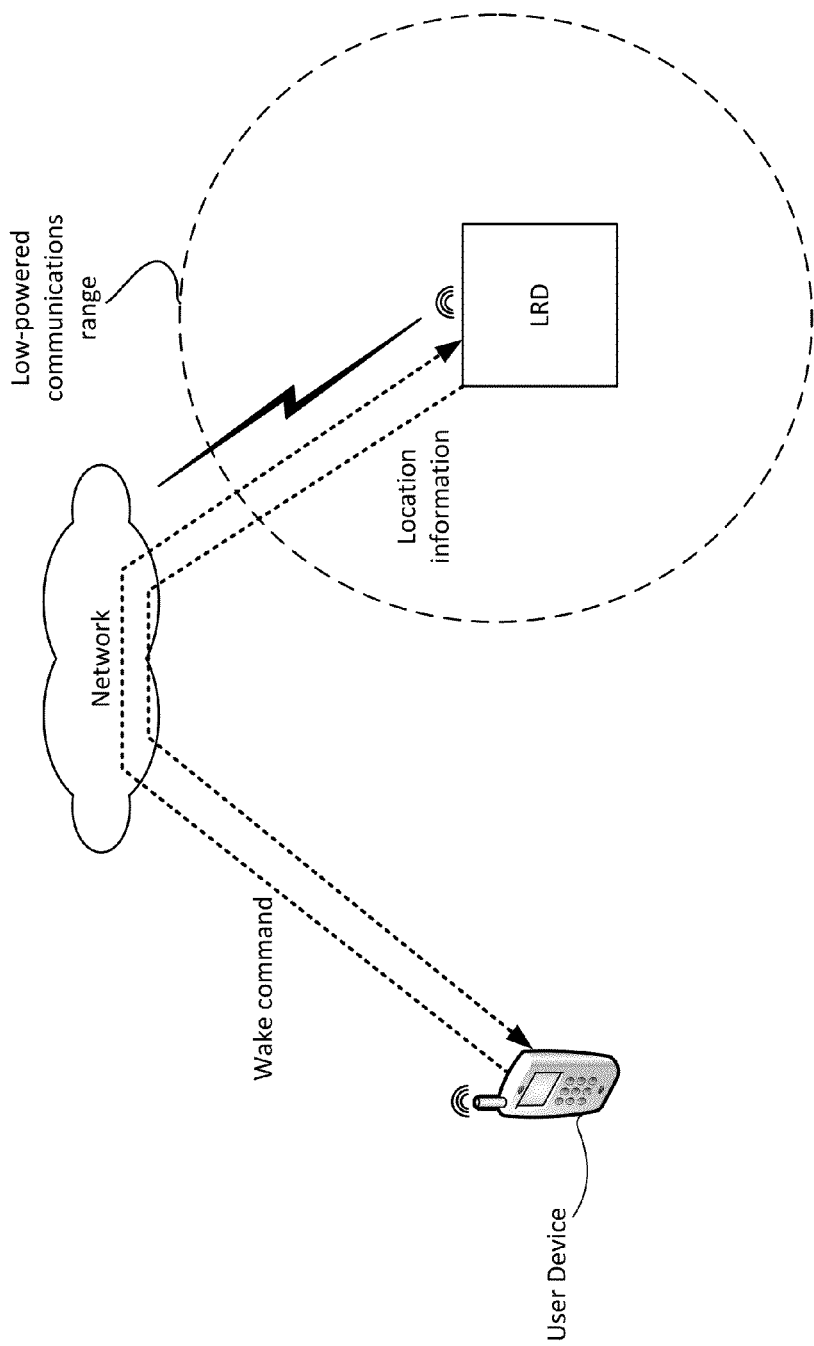
FIGS. 1 and 2 illustrate an example overview of an implementation described herein.
Figure 2:
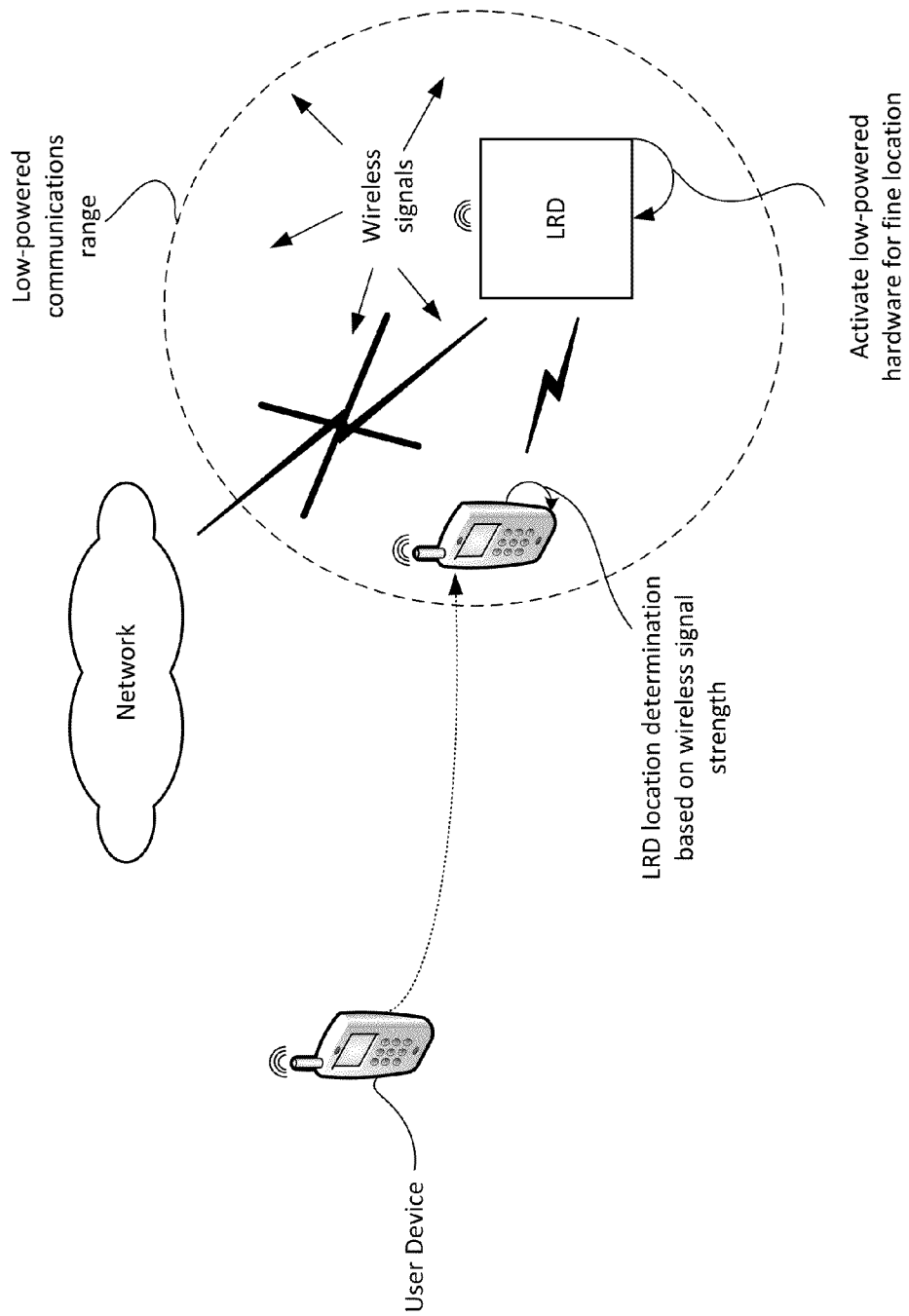

FIGS. 1 and 2 illustrate an example overview of an implementation described herein. In FIGS. 1 and 2, a user device may be used to locate an LRD. For example, when a user wishes to locate the LRD, the user may open a location tracking application on the user device. The user device may communicate with the LRD over a network (e.g., a cellular network and via an application server as described in greater detail below) to wake to the LRD from a passive mode. The LRD may then power on hardware to determine its location, and transmit the location of the LRD (e.g., a "coarse" location which may identify the location of the LRD within the order of a few meters or tens of meters) to the user device via the network. In some implementations, the LRD may periodically transmit its location information periodically. For example, the LRD may determine its "coarse" location using high-powered a global positioning system (GPS) radio. Additionally, or alternatively, the LRD may determine its "coarse" location using a Wi-Fi radio by detecting the presence of a nearby Wi-Fi network of which the location may be known. Additionally, or alternatively, the LRD may determine its "coarse" location using a cellular radio to identify an identifier of a cellular base station of which the location may be known. Additionally, or alternatively, the LRD may determine its "coarse" location using some other technique. The LRD may output the "coarse" location information to the user device via the network using high-powered communications hardware (e.g., a cellular radio). In the example shown FIG. 1, the user device may currently be located outside of a low-powered communications range relative to the LRD.

Referring to FIG. 2, based on the coarse location, the user of the user device may travel towards the LRD (e.g., locate the LRD and/or an object attached to the LRD). When the user device travels to within the low-powered communications range (or when the LRD travels to within the low-powered communications range of the user device), the user device may determine that a "fine location" may now be available (e.g., since the user device is within the low-powered communications range). In order to obtain the fine location (e.g., to assist the user to better locate the LRD), the user device may direct the LRD to power on low-powered hardware (e.g., a Bluetooth radio, a Near-Field Communications (NFC) radio, or the like). As described in greater detail below, the user device may direct the LRD to power on the low-powered hardware via an application server.

The LRD may power on the low-powered hardware, and output wireless signals via the low-powered hardware. The user device may determine the strength of the wireless signals, and may determine the fine location of the LRD based on the signal strength. For example, the stronger the strength, the closer the location of the LRD relative to the user device. The user device may present the fine location of the LRD, and may continuously indicate the distance between the user device and the LRD based on changes in signal strength as the user device travels towards the LRD. Once the user has located the LRD, the user may indicate (e.g., via the user device) that the LRD has been found, and the user device may direct the LRD (e.g., directly or indirectly via an application server communicating with the LRD over the cellular network) to disable its low-powered hardware. Also, the user device may direct the LRD to enter a passive or sleep mode, and to disable or set any other hardware that may no longer be needed to a passive or sleep mode (e.g., GPS hardware, cellular radios, WiFi radios, etc.). As a result, power-consuming radios may be powered off or set to a passive mode when these radios are not needed.

Figure 3A:
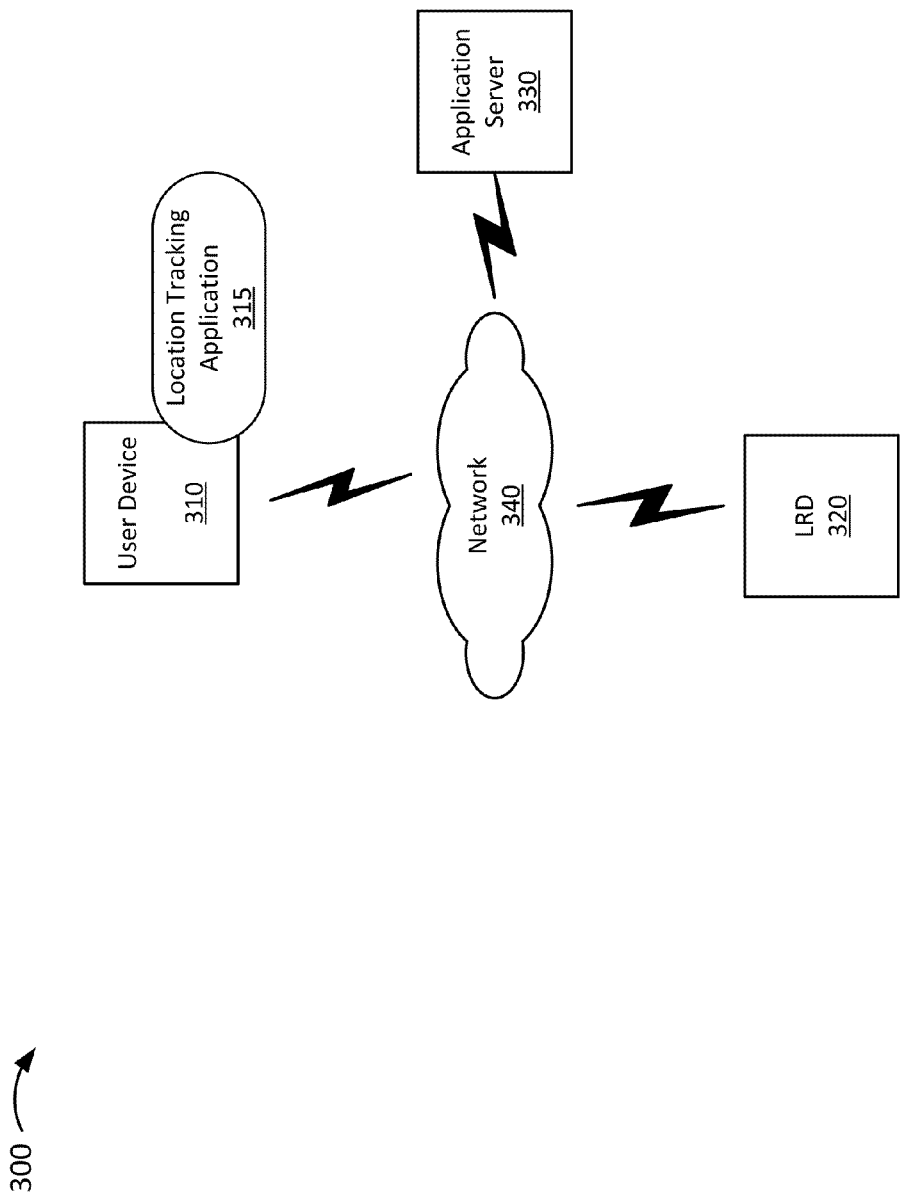
FIG. 3A illustrates an example environment in which systems and/or methods, described herein, may be implemented.

FIG. 3A is a diagram of an example environment 300 in which systems and/or methods described herein may be implemented. As shown in FIG. 3A, environment 300 may include user device 310, LRD 320, application server 330, and network 340.

User device 310 may include a device capable of communicating via a network, such as network 340. For example, user device 310 may correspond to a mobile communication device (e.g., a smart phone or a personal digital assistant (PDA)), a portable computer device (e.g., a laptop or a tablet computer), a gaming device, and/or another type of computing device.

User device 310 may track and output the location of LRD 320. For example, user device 310 may implement an application, labeled as location tracking application 315. When location tracking application 315 is executed, location tracking application 315 may determine the location of LRD 320, either by direct communication with LRD 320 or via communication with application server 330. User device 310 may receive the information identifying the location of LRD 320 (e.g., via location tracking application 315). User device 310, such as via location tracking application 315, may display the location information of LRD 320 (e.g., on a map).

As mentioned, in some implementations, user device 310, such as via location tracking application 315, may display location information of LRD 320, such as on a geographic map. Additionally, or alternatively, user device 310 may display a heat map that changes colors based on the distance between user device 310 and LRD 320. Additionally, or alternatively, user device 310 may output an audible alert based on the distance between user device 310 and LRD 320. For example, the audible alert may change in tone, volume, or in another manner based on the distance between user device 310 and LRD 320. In some implementations, LRD 320 may output the audible alert.

LRD 320 may be an object tracker, such as a keychain, a dongle, a wearable computing device (e.g., a watch, a collar, etc.), and/or some other type of object tracker. In some implementations, LRD 320 may be attached to an object via mounting hardware, adhesives, straps, and/or some via some other technique. LRD 320 may be attached to an object to track the location of the object (e.g., track the location of personal valuables, pets, etc.). LRD 320 may include location identification and/or communications hardware, such as a GPS radio, a cellular radio, a WiFi radio, a Bluetooth radio, an NFC radio, a radio frequency ID (RFID) radio, or the like. LRD 320 may determine the location of LRD using the location identification hardware, and output the location information to user device 310 via network 340. In some implementations (e.g., when LRD 320 is located within a low-powered communications range), LRD 320 may refrain from determining its location using the location identification hardware, and may refrain from communication with user device 310 using high-powered communications hardware. For example, LRD 320 refraim from determining its location when LRD 320 detects the presence of user device 310 via a Bluetooth signal and/or some other type of short-range signal emitted by user device 310. LRD 320 may power on low-powered communications hardware to communicate with user device 310 in lieu of communicating via high-powered communications hardware.

Application server 330 may include one or more server devices that may determine the location of LRD 320 and output the location to user device 310 (e.g., when user device 310 requests the location of LRD 320). Application server 330 may direct LRD 320 to power on and/or power off particular hardware to maximize battery life on LRD 320.

Network 340 may include one or more wired and/or wireless networks. For example, network 340 may include a cellular network (e.g., a second generation (3G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a Bluetooth network, an NFC network, an RFID network, a public land mobile network (PLMN), and/or another network. Additionally, or alternatively, network 340 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 300 is not limited to what is shown in FIG. 3A. In practice, environment 300 may include additional devices and/or networks; fewer devices and/or networks; different devices and/or networks; or differently arranged devices and/or networks than illustrated in FIG. 3A. Also, in some implementations, one or more of the devices of environment 300 may perform one or more functions described as being performed by another one or more of the devices of environment 300. Devices of environment 300 may interconnect via wired connections, wireless connections, or a combination of wired and wireless connections.

Figure 3B:
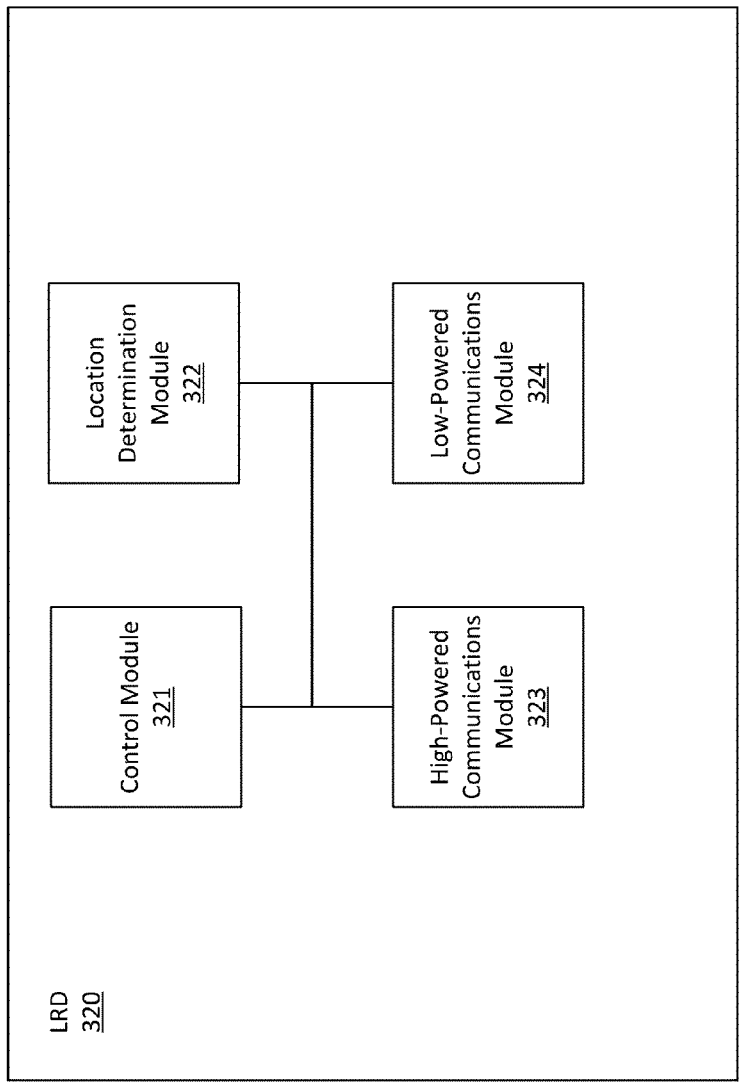
FIG. 3B illustrates example components of a location reference device.

FIG. 3B illustrates example components of LRD 320. As shown in FIG. 3B, LRD 320 may include control module 321, location determination module 322, high-powered communications module 323, and low-powered communications module 324.

Control module 321 may include hardware and/or software to communicate with user device 310 and/or application server 330 via a cellular network. For example, control module 321 may control the operation of location determination module 322, high-powered communications module 323, and low-powered communications module 324. Control module 321 may include, for example, a processor, microprocessor, or processing logic that may include processing circuitry to interpret and execute instructions. Control module 321 may additionally include a memory, such as a volatile and/or non-volatile memory that may be used to store and execute the instructions. The operation of control module 321 to control the functionality of LRD 320 will be described in more detail below.

Location determination module 322 may include hardware and/or software to determine the location of LRD 320. For example, location determination module 322 may include a cellular radio, a GPS radio, a Wi-Fi radio, and/or some other type of radio via which a "coarse" location of LRD 320 may be determined. Location determination module 322 may continuously determine the location of LRD 320, or may determine the location of LRD 320 as a single event in response to a single request for the location of LRD 320.

High-powered communications module 323 may include hardware and/or software to communicate with user device 310 and/or application server 330 via a cellular network. For example, high-powered communications module 323 may include a cellular radio and/or some other type of radio to communicate with user device 310 and/or application server 330 via a cellular network. In some implementations, high-powered communications module 323 may receive location information of LRD 320 from location determination module 322, and output the location information to user device 310 via application server 330. In some implementations, high-powered communications module 323 may continuously output the location of LRD 320 to user device 310. Alternatively, high-powered communications module 323 may output the location LRD 320 each time the location of LRD 320 is requested by user device 310.

In some implementations, high-powered communications module 323 may be set to a "sleep" or "low-power" mode. When in such a mode, high-powered communications module 323 may not be actively communicating with user device 310, but may be able to receive a wake command from user device 310 and/or application server 330. Once the wake command is received, high-powered communications module 323 may enter a "normal" or "active" mode to actively communicate with user device 310 and/or application server 330.

Low-powered communications module 324 may include hardware and/or software to communicate with user device 310 via low-powered hardware, such as via a Bluetooth radio, an NFC radio, an RFID device, a Wi-Fi radio, or the like. Low-powered communications module 324 may output wireless signals to permit user device 310 to determine a "fine" location of LRD 320 based on the strength of the wireless signals received by user device 310. Low-powered communications module 324 may output the wireless signals when user device 310 is within a low-powered communications range of LRD 320 and when control module 321 has enabled low-powered communications module 324. In some implementations, low-powered communications module 324 may output the wireless signals in order for user device 310 to pair with LRD 320 or for LRD 320 to detect the wireless signals (e.g., as beacon signals).

Figure 4:
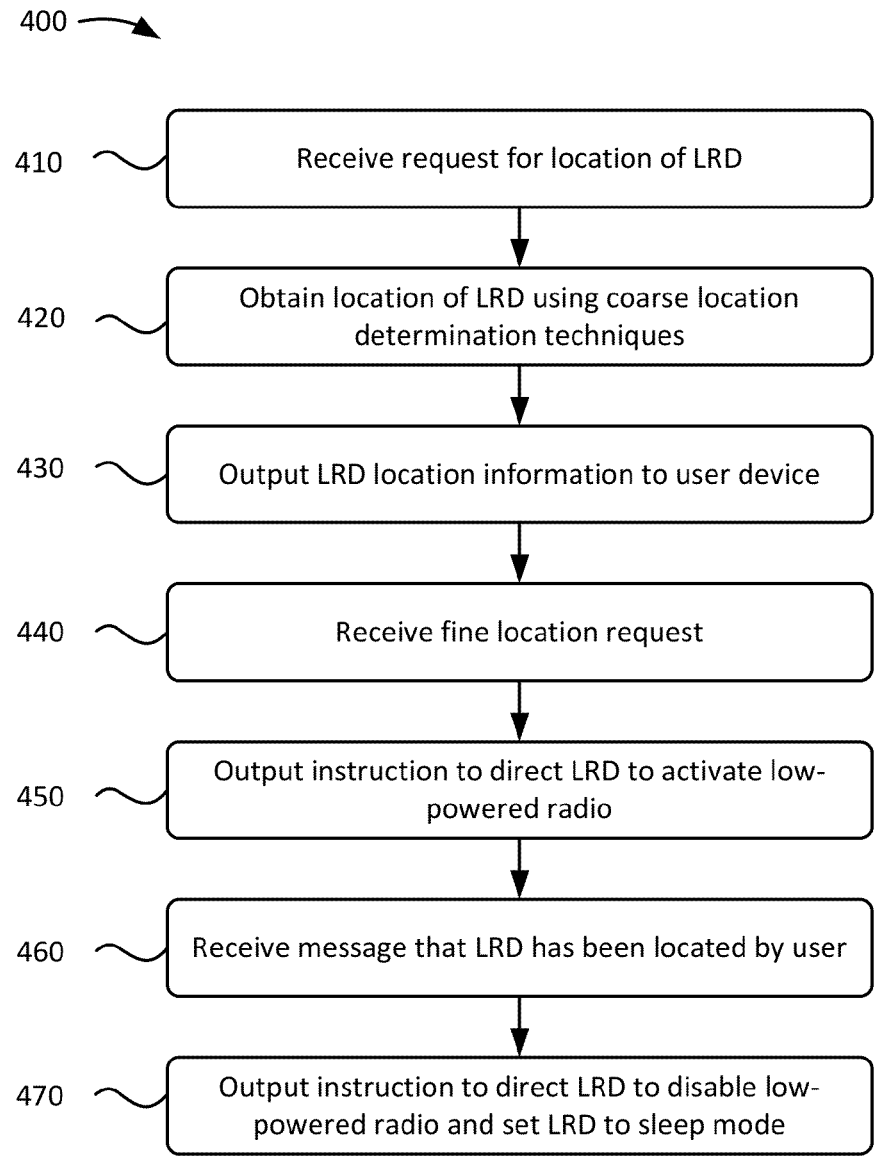
FIGS. 4-6 illustrate flowcharts of example processes for controlling hardware on a location reference device in order to minimize power consumption by the location reference device.

FIG. 4 illustrates a flowchart of an example process 400 for controlling hardware on an LRD in order to minimize power consumption by the LRD. In some implementations, process 400 may be performed by application server 330 and/or user device 310. Additionally, or alternatively, some or all of the blocks of process 400 may be performed by another device in environment 300.

As shown in FIG. 4, process 400 may include receiving a request for the location of an LRD (block 410). For example, application server 330 may receive the request, from user device 310, for the location of LRD 320. In some implementations, application server 330 may receive the request when a user of user device 310 opens a location tracking application used to track the location of LRD 320. Additionally, or alternatively, the user may request the location of the LRD using some other technique (e.g., by outputting a text message to application server 330).

In some implementations, the location request may be a one-time location request, or a continuous location request. For example, the user of user device 310 may request a one-time location of LRD 320 if LRD 320 is attached to a non-moving object. User device 310 may request a continuous location request of LRD 320 when LRD 320 is attached to a moving object, person, or animal. In some implementations, the one-time location request may consume less power on LRD 320 than the continuous location request (e.g., since the continuous location request may cause LRD 320 to continuously determine and output its location information).

Process 400 may further include obtaining the location of the LRD using coarse location determination techniques (block 420). For example, application server 330 may obtain the location of LRD 320 via GPS location determination techniques implemented by LRD 320. For example, application server 330 may "wake" LRD 320 from a low power or sleep state (e.g., via high-powered communications module 323) and request LRD 320 to determine its location (i.e., a coarse location) using location determination hardware and/or software associated with location determination module 322. LRD 320 may output its location to application server 330 (e.g., via high-powered communications module 323). For a GPS-based location determination, for example, depending on environmental factors, the location of LRD 320 may typically be determined within a few meters or tens of meters.

If the request for the location of the LRD 320 (in block 410) was a one-time location request, application server 330 may direct LRD 320 to obtain the location of LRD 320, output the location of LRD 320 to application server 330, and disable location identification hardware on LRD 320 that may not be needed once the location of LRD 320 has been obtained. If the request for the location of the LRD 320 (in block 410) was a continuous location request, location determination module 3220 may direct LRD to continuously obtain the location of LRD 320 and continuously output the location of LRD 320 to application server 330. In one implementation, LRD 320, once woken, may dynamically determine whether LRD 320 is moving (e.g., based on an acceleration sensor or based on multiple, time-separated location readings). When LRD 320 that it is in motion, LRD 320 may operate in a "continuous location request" mode and may otherwise operate in "one-time location request" mode.

Process 400 may further include outputting the LRD location information to the user device (block 430). For example, application server 330 may transmit the location information of LRD 330 to user device 310. Alternatively or additionally, LRD 320 may be configured to directly transmit the LRD location information to user device 310. User device 310, such as via location tracking application 315, may provide the most recently received location to the user. As previously mentioned, the coarse location information provided to user device 310 may be accurate to within a few meters or tens of meters. In some implementations, this level of accuracy may be enough for the user to locate LRD 320. In this case, the user may potentially indicate, such as via location tracking application 315, that the LRD is located, in which case process 400 may be terminated and low-powered communications module 324 may not need to be turned on. In some situations, however, the coarse location information, by itself, may not be enough for the user to locate LRD 320.

Process 400 may also include receiving a fine location request (block 440). For example, application server 330 may receive the fine location request from user device 310. In some implementations, user device 310 may output the fine location request when user device 310 is within low-powered communications range of LRD 320. For example, user device 310 may determine that user device 310 is within low-powered communications range of LRD 320 based on the location information of LRD 320 received by user device 310 in block 430. In some implementations, user device 310 may output the fine location request when a user of user device 310 requests the fine location of LRD 320 (e.g., to better aid the user in locating LRD 320). In some implementations, user device 310 may output the fine location request when user device 310 is within low-powered communications range of LRD 320 and without receiving a request from the user for the fine location. Alternatively, in some implementations, application server 330 may not need to explicitly receive a fine location request. For example, low-powered communications module 324 may always be turned on for the duration of a "find operation" (e.g., low-powered communications module 324 as part of the signaling associated with blocks 410/420).

Process 400 may further include outputting an instruction to direct LRD to activate a low-powered radio (block 450). For example, application server 330 may output an instruction to control module 321 to cause LRD 320 to activate low-powered communications hardware associated with low-powered communications module 324. Based on receiving the control instruction, LRD 320 may activate the low-powered communications hardware, and output wireless signals via the low-powered communications hardware. User device 310 may then obtain the fine location of LRD 320 based on the strength of the wireless signals received by user device 310 and/or based on communications via a corresponding low-powered radio technology (e.g., Bluetooth®). User device 310 may indicate the distance between user device 310 and LRD 320 based on the signal strength (e.g., in the form of a visual indication such as a heat-map, an audible indication, etc.). As the user of user device 310 travels towards and/or away from LRD 320, the receive signal strength may fluctuate, and user device 310 may modify the indication of the distance between user device 310 and/or LRD 320 (e.g., by changing colors on the heat map, increasing or decreasing the volume of the audible indication, etc.). The visual and/or audible indications, output by user device 310, may aid the user in locating LRD 320.

Process 400 may also include receiving a message that the LRD has been located by the user (block 460). For example, application server 330 may receive, from user device 310, a message that LRD 320 has been located by the user. As an example, the user of user device 310 may indicate, using user device 310, that the LRD has been located (e.g., by pressing a virtual or physical button on user device 310 designated for indicating that LRD 320 has been located).

Process 400 may further include outputting an instruction to direct LRD to disable the low-powered radio and set the LRD into sleep mode (block 470). For example, application server 330 may output the instruction to control module 321 to direct LRD 320 to disable the low-powered radio based on receiving the message that LRD 320 has been located by the user. In some implementations, application server 330 may output the instruction when application server 330 receives, from user device 310, an indication that user device 310 is no longer within low-powered communications range of LRD 320. Alternatively or additionally, application server 330 may output the instruction after a predetermined maximum time has elapsed (e.g., after one hour, application server 330 may assume that the search operation, for LRD 320, is over, even when no message has been received). In some implementations, application server 330 may indicate, to user device 310, that application server 330 will be powering off the low-powered radio on LRD 320 within a particular period of time (e.g., 30 seconds, 60 seconds, or some other period of time). User device 310 may present an option for the user of user device 310 to keep the low-powered radio powered on.

In some implementations, application server 330 may also direct LRD 320 to disable hardware and/or software associated with location determination module 322 (e.g., if LRD 320 had been continuously outputting its location information). Application server 330 may also direct LRD 320 to be set into a sleep or low-powered mode where location determination hardware and communications hardware is disabled, except for hardware that may need to be enabled to receive wake commands. As a result, LRD 320 may only enable hardware when a user wishes to locate LRD 320. Further, low-powered hardware may be enabled only when user device 310 is within the low-powered communications range of LRD 320.

Figure 5:
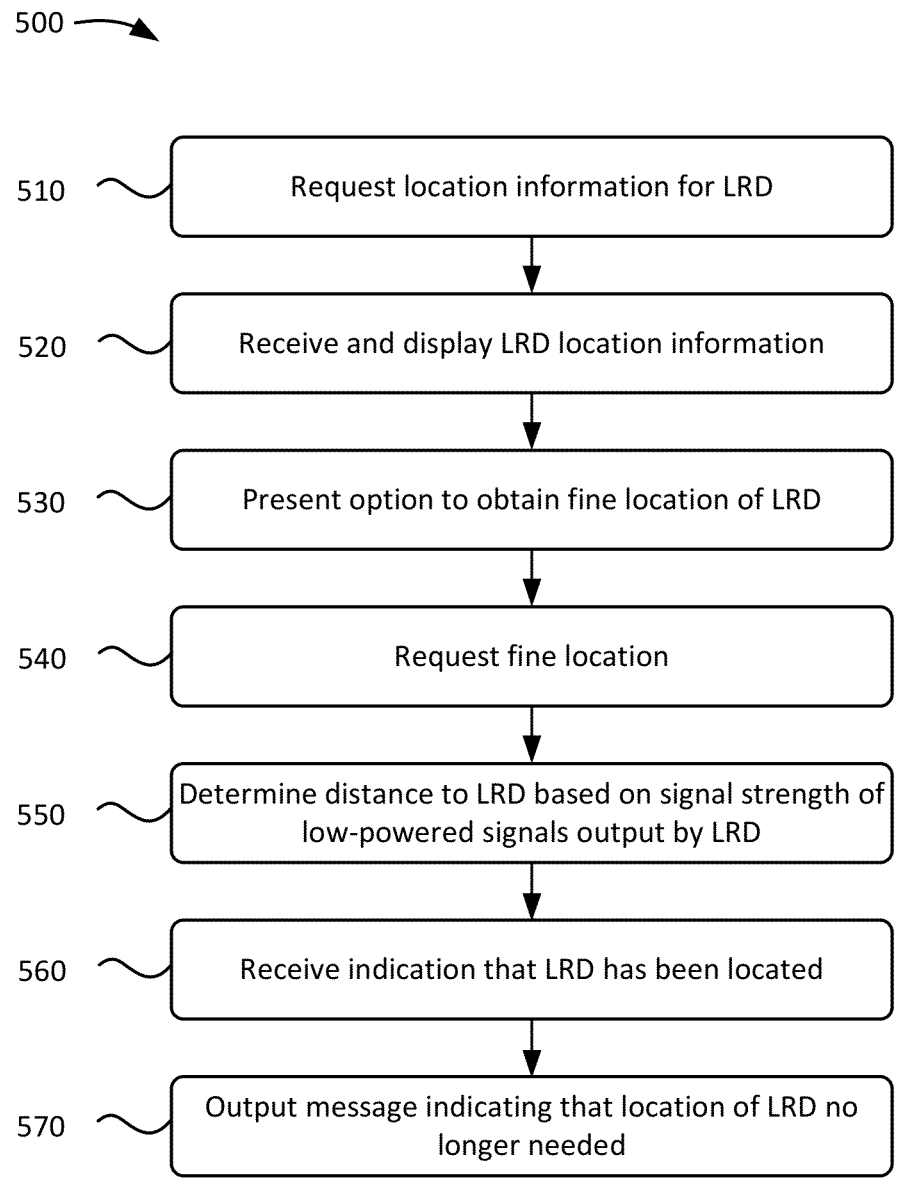

FIG. 5 illustrates a flowchart of an example process 500 for controlling hardware on the LRD to reduce power consumption by the LRD. In some implementations, process 500 may be performed by user device 310. Additionally, or alternatively, some or all of blocks 500 may be performed by another device in environment 300.

As shown in FIG. 5, process 500 may include requesting location information for an LRD (block 510). For example, a user of user device 310 may request the location of LRD 320 via location tracking application 315. The request may be a one-time location request (e.g., to conserve battery power on LRD 320), or a continuous location request (e.g., if LRD 320 is attached to a moving object). In some implementations, user device 310 may request the location of LRD 320 via application server 330, and application server 330 may output a wake command to LRD 320 in response to receiving the request. Application server 330 may receive the location of LRD 320 and output the location information to user device 310.

Process 500 may also include receiving and displaying the LRD location information (block 520). For example, user device 310 may receive the location information for LRD 320 from application server 330. User device 310 may display the location of LRD 320 via location tracking application 315 (e.g., in the form of a map). In some implementations, user device 310 may display a visual indication of the distance between LRD 320 and user device 310. Additionally, or alternatively, user device 310 may output an audible indication of the distance between LRD 320 and user device 310. In some implementations, user device 310 may initially receive a "coarse" location of LRD 320 since the wake command, outputted by application server 330, may direct LRD 320 to output location information using GPS hardware that may only provide "coarse" location information. User device 310 may continuously receive the location of LRD 320 if the location request was a continuous location request.

Process 500 may further include presenting an option to obtain a fine location of the LRD (block 530). For example, user device 310 may present an option to obtain the fine location of LRD 320 when user device 310 is within a low-powered communications range of LRD 320. As an example, a user interface of location tracking application 315 may indicate whether the fine location is available based on whether user device 310 is within the low-powered communications range of LRD 320.

Process 500 may also include requesting the fine location (block 540). For example, user device 310 may request the fine location of LRD 320 when user device 310 is within the low-powered communications range. In some implementations, user device 310 may request the fine location of LRD 320 further based on receiving a selection for the fine location from a user of user device 310. Alternatively, user device 310 may request the fine location of LRD 320 without receiving the selection from the user. In some implementations, user device 310 may request the fine location of LRD 320 via application server 330. Based on receiving the request, application server 330 may output a control instruction to direct LRD 320 to power on low-powered hardware and to output wireless signals via the low-powered hardware.

Process 500 may further include determining a distance to the LRD based on a strength of received wireless signals outputted by the LRD (block 550). For example, user device 310 may receive the wireless signals outputted by the low-powered hardware of LRD 320, and may determine a distance between LRD 320 and user device 310 based on the received signal strength.

User device 310 may indicate the distance between user device 310 and LRD 320 based on the signal strength (e.g., in the form of a visual indication such as a heat-map, an audible indication, etc.). As the user of user device 310 travels towards and/or away from LRD 320, the receive signal strength may fluctuate, and user device 310 may modify the indication of the distance between user device 310 and/or LRD 320 (e.g., by changing colors on the heat map, increasing or decreasing the volume of the audible indication, etc.). The visual and/or audible indications, output by user device 310, may aid the user in locating LRD 320.

Process 500 may also include receiving an indication that that LRD has been located (block 560). For example, user device 310 may receive the indication from the user (e.g., via location tracking application 315) that the LRD has been located. For example, the user may select a physical or virtual button on user device 310 designated to indicate that LRD 320 has been located.

Process 500 may further include outputting a message indicating that the location of the LRD is no longer needed (block 570). For example, user device 310 may output the message, to application server 330, indicating that the location of LRD 320 is no longer needed when the user has located LRD 320 or has otherwise indicated that the user is no longer interested in receiving the location of LRD 320. Based on receiving this message, application server 330 may direct LRD 320 to enter a sleep or low-powered mode by disabling low-powered hardware and/or any other hardware that LRD 320 may have had active.

In some implementations, user device 310 may output a message that low-powered hardware on LRD 320 should be disabled, but LRD 320 should continue to output the coarse location of LRD 320. For example, user device 310 may output this message when user device 310 is no longer within low-powered communications range of LRD 320, but when the user still wishes to track LRD 320 (e.g., if LRD 320 is attached to a moving object). Based on receiving this message, application server 330 may direct LRD 320 to power off the low-powered hardware (e.g., since user device 310 may be out of range to receive the wireless signals output by the low-powered hardware).

Figure 6:
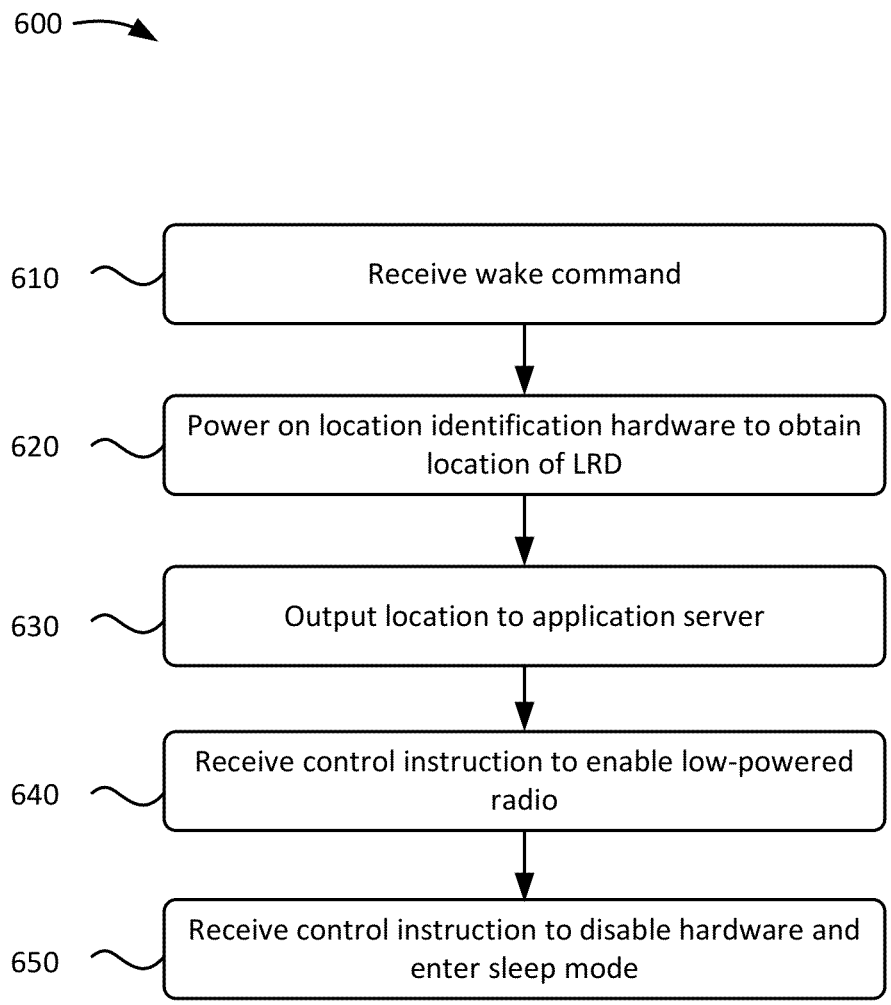

FIG. 6 illustrates a flowchart of an example process 600 for controlling hardware on the LRD to reduce power consumption by the LRD. In some implementations, process 600 may be performed by LRD 320. Additionally, or alternatively, some or all of blocks 600 may be performed by another device in environment 300.

As shown in FIG. 6, process 600 may include receiving a wake command (block 610). For example, control module 321 of LRD 320 may receive the wake command from application server 330 (e.g., when a user of user device 310 requests the location of LRD 320).

Process 600 may also include powering on location identification hardware to obtain the location of the LRD (block 620). For example, control module 321 of LRD 320 may enable location determination module 322 based on receiving the wake command. Location determination module 322 may obtain the location of LRD 320 as described above.

Process 600 may further include outputting the location to the application server (block 630). For example, high-powered communications module 323 of LRD 320 may output the location of LRD 320 to application server 330 as described above.

Process 600 may also include receiving a control instruction to enable low-powered hardware on LRD 320 (block 640). For example, control module 321 of LRD 320 may receive the control instruction from application server 330 (e.g., when user device 310 is within a low-powered communications range of LRD 320). Based on receiving the control instruction, control module 321 may enable low-powered communications module 324 on LRD 320 and output wireless signals via the low-powered hardware.

Process 600 may further include receiving a control instruction to disable hardware and enter a sleep mode (block 650). For example, control module 321 of LRD 320 may receive the control instruction from application server 330. As described above, application server 330 may output the control instruction to disable low-powered hardware on LRD 320 when user device 310 is no longer within low-powered communications range of LRD 320. Additionally, or alternatively, application server 330 may output the control instruction to disable low-powered hardware on LRD 320 and direct LRD 320 to enter a sleep mode when a user of user device 310 has indicated that LRD 320 has been located or when the user of user device 310 has otherwise indicated that location information for LRD 320 is no longer desired.

Figure 7:
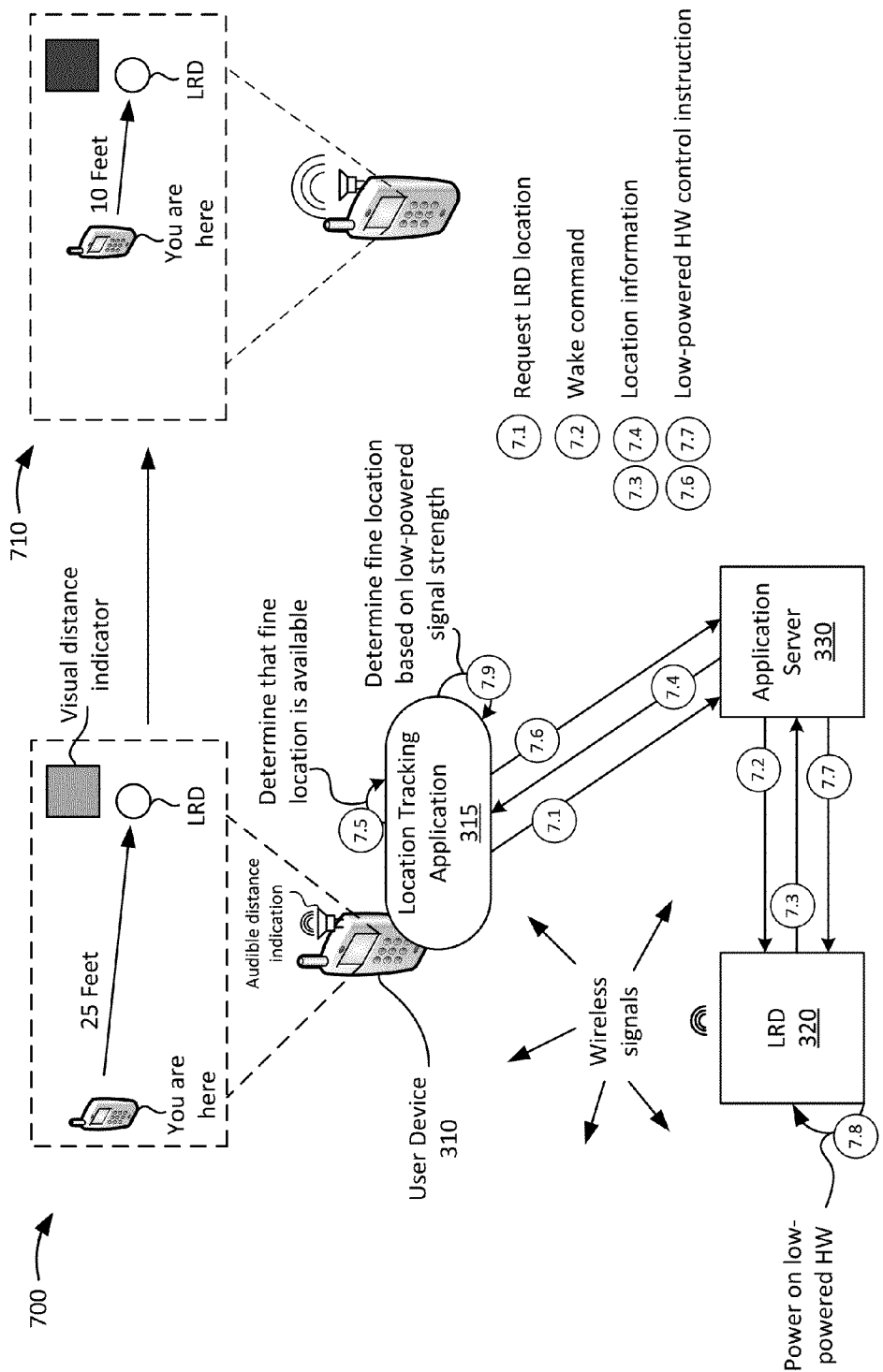
FIG. 7 illustrates an example implementation for controlling hardware on a location reference device in order to minimize power consumption by the location reference device.

FIG. 7 illustrates an example implementation for controlling hardware on an LRD to reduce power consumption by the LRD. As shown in FIG. 7, user device 310 (e.g., via location tracking application 315), may request the location of LRD 320 (e.g., when a user of user device 310 wishes to locate an object attached to LRD 320). For example, location tracking application 315 may request the location of LRD 320

(arrow 7.1) when the user opens the location tracking application on user device 310. Location tracking application 315 may request the location of LRD 320 from application server 330, and application server 330 may output a wake command to LRD 320 (arrow 7.2) based on receiving the location request. LRD 320 may then power on location identification hardware to determine the location of LRD 320 (e.g., a "coarse" location). LRD 320 may then output its location information to user device 310 via application server 330 (arrows 7.3 and 7.4). As described above (e.g., when the location request is a continuous location request), user device 310 may continuously receive location information for LRD 320.

User device 310 may then display the location of LRD 320 relative to the location of user device 310 on a map (e.g., as shown in interface 700). In some implementations, user device 310 may visually display the distance between LRD 320 and user device 310 (e.g., as a color or pattern visual indicator). Additionally, or alternatively, user device 310 may audibly indicate the distance between LRD 320 and user device 310. In some implementations, LRD 320 may output the audible alert.

In FIG. 7, assume that user device 310 is located within the low-powered communications range of LRD 320 (e.g., when the location of LRD 320 is first requested, or when user device 310 later travels to within the low-powered communications range of LRD 320). Given this assumption, location tracking application 315 may determine that a "fine" location is available (arrow 7.5). Based on determining that the fine location is available, location tracking application 315 may direct LRD 320 (e.g., via application server 330) to enable low-powered hardware on LRD 320 (arrows 7.6 and 7.7). In some implementations, location tracking application 315 may direct LRD 320 to enable low-powered hardware on LRD 320 based on receiving a request from the user to receive fine location information. Alternatively, location tracking application 315 may direct LRD 320 to enable the low-powered hardware without involving the user.

LRD 320 may power on the low-powered hardware (arrow 7.8), and output wireless signals via the low-powered hardware. At this point, LRD 320 may discontinue providing its location to user device 310, and user device 310 may determine the location of LRD 320 based on the strength of wireless signals outputted via the low-powered hardware of LRD 320 and received by user device 310. User device 310 may display the fine location of LRD 320 to better aid the user in locating LRD 320 in relation to when a coarse location is displayed. As user device 310 travels towards LRD 320 (e.g., as the user of user device 310 travels towards LRD 320 while in possession of user device 310), the signal strength of the wireless signals received user device 310 may increase.

As shown in interface 710, user device 310 may visually indicate the distance between user device 310 and LRD 320 as the signal strength increases (or decreases). For example, as the signal strength increases, user device 310 may visually indicate that the distance between user device 310 and LRD 320 is decreasing (e.g., as shown in a map and/or as shown by a change in color and/or pattern in the visual distance indicator). Also, as the signal strength increases, user device 310 may audibly indicate that the distance between user device 310 and LRD 320 is decreasing (e.g., by increasing the volume of the audible indication, adjusting the tone of the audible indication, adjusting the pattern of the audible indication, etc.). In some implementations, LRD 320 may output the audible alert. Once the user has located LRD 320, the user may indicate (e.g., via location tracking application 315) that LRD 320 has been located, and location tracking application 315 may then direct LRD 320 to power off the low-powered hardware and enter a sleep mode (e.g., via application server 330).

Figure 8:
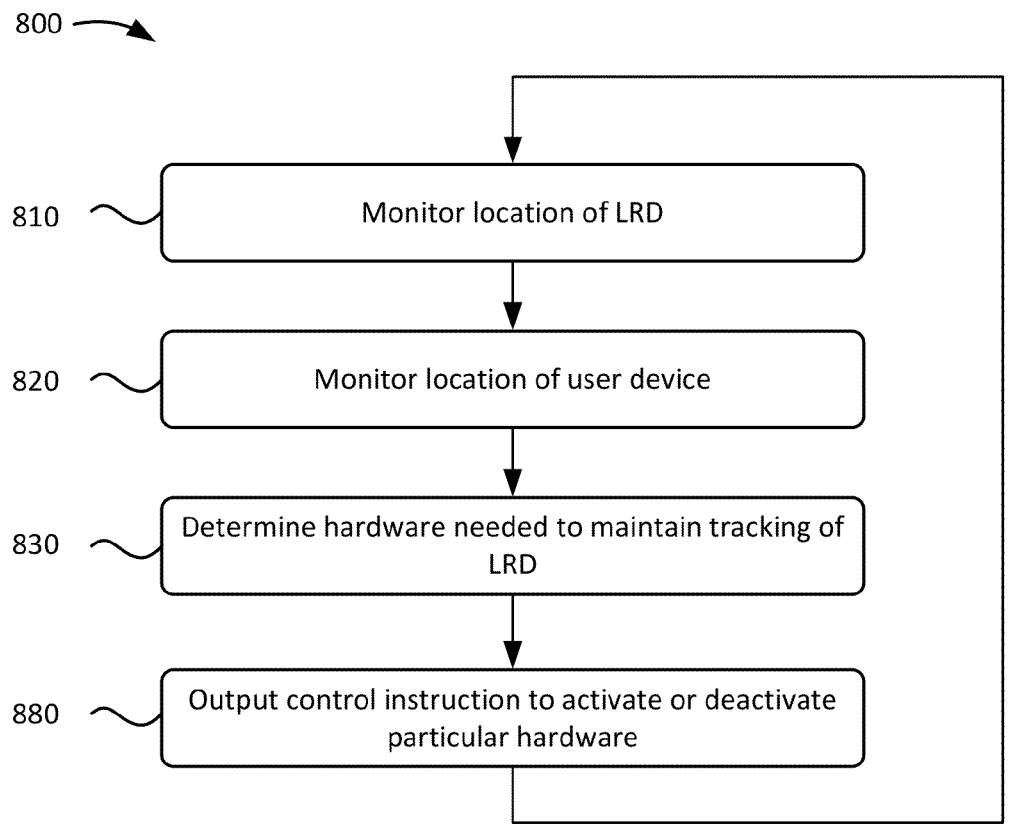
FIG. 8 illustrates a flowchart of an example process for activating radios on an LRD when needed, and deactivating the radios when not needed in order to conserve battery consumption by the location reference device.

FIG. 8 illustrates a flowchart of an example process 800 for activating radios on an LRD when needed, and deactivating the radios when not needed in order to conserve battery consumption by the LRD. In some implementations, process 800 may be performed by user device 310 (e.g., via location tracking application 315 running within user device 310). Alternatively or additionally, some or all of blocks of process 800 may be performed by one or more other devices, such as by application server 330.

As shown in FIG. 8, process 800 may include monitoring a location of an LRD (block 810). For example, location tracking application 315 may determine or obtain the location of LRD 320 when a user of user device 310 requests the location of LRD 320. For example, user device 310 may request and receive the location of LRD 320 via network 340 (e.g., from application server 330 or by directly communicating with LRD 320 via network 340). For example, user device 310 may transmit a location request to LRD 320, which may determine its location via high-powered location identification hardware, and output the location information to user device 310 via network 340 (e.g., via high-powered communications hardware). Alternatively, application server 330 may obtain the location of LRD 320 and output the location information for LRD 320 to user device 310 (e.g., by outputting a wake command to LRD 320, as described above).

Process 800 may also include monitoring a location of the user device (block 820). For example, location tracking application 315 may monitor the location of user device 310 when user device 310 receives location information for LRD 320. In some implementations, location tracking application 315 may monitor the location by invoking location identification hardware and/or location identification software processes on user device 310.

Process 800 may further include determining hardware needed to maintain tracking of the LRD (block 830). For example, location tracking application 315 may determine the types of hardware on LRD 320 that should be active in order for user device 310 to continuously track LRD 320, while minimizing power consumption by LRD 320. Location tracking application 315 may determine the types of hardware that should be active based on the location of LRD 320 relative to the location of user device 310. As an example, assume that LRD 320 is not within a low-powered communications range of user device 310. Given this assumption, location tracking application 315 may determine that high-powered hardware should be active so that user device 310 may track the location of LRD 320. If, on the other hand, LRD is within a low-powered communications range of user device 310, location tracking application 315 may determine that low-powered hardware should be active, and that high-powered hardware should be inactive.

Process may also include outputting a control instruction to activate or deactivate particular hardware (block 880). For example, location tracking application 315 may output a control instruction to direct LRD 320 to activate or deactivate particular hardware (e.g., the hardware that location tracking application 315 determined should be active or inactive). In some implementations, location tracking application 315 may output the control instruction to LRD 320 via application server 330. As an example, location tracking application 315 may output a control instruction to direct LRD 320 to deactivate high-powered hardware and activate low-powered hardware when LRD 320 enters a low-powered communications range of user device 310. LRD 320 may receive the control instruction, discontinue use of the high-powered hardware, and power on low-powered hardware. User device 310 may track the location of LRD 320 based on a signal strength of wireless signals output by LRD 320 via low-powered hardware.

Process 800 may be repeated, and location tracking application 315 may continuously output control instructions to activate or deactivate hardware on LRD 320 so that user device 310 can continue to monitor the location of LRD 320 while minimizing the power consumption of LRD 320. For example, location tracking application 315 may continuously monitor the location of LRD 320 with respect to the location of user device 310, determine that high-powered hardware on LRD 320 should be deactivated when LRD 320 is within a low-powered communications range of user device 310, and output a control instruction to deactivate the high-powered hardware and activate the low-powered hardware.

In some implementations, location tracking application 315 may output a control instruction to direct LRD 320 to reactivate high-powered hardware (e.g., while user device 310 is still within the low-powered communications range of LRD 320). For example, location tracking application 315 may output the control instruction (e.g., via a control channel associated with the low-powered hardware, or via application server 330) to direct LRD 320 to reactivate high-powered hardware when a signal strength, of a wireless signal outputted by LRD 320 via low-powered hardware, drops below a particular threshold.

LRD 320 may then determine the location of LRD 320 using high-powered location determination hardware, and output this location information to user device 310 using high-powered communications hardware (e.g., to permit user device 310 to continue tracking LRD 320 when LRD 320 is no longer within a low-powered communications range of user device 310). If user device 310 continues to receive wireless signals after LRD 320 has re-activated high powered hardware, and if the signal strength of wireless signals outputted by the low-powered hardware of LRD 320 rises above a particular threshold, location tracking application 315 may direct LRD 320 to again deactivate the high powered hardware.

While process 800 describes activating and deactivating location determination hardware and communications hardware on LRD 320, process 800 is not so limited. For example, location determination software processes and/or communications software processes may be activated and/or deactivated, in addition to, or instead of, the location determination hardware and/or the communications hardware.

Figure 9:
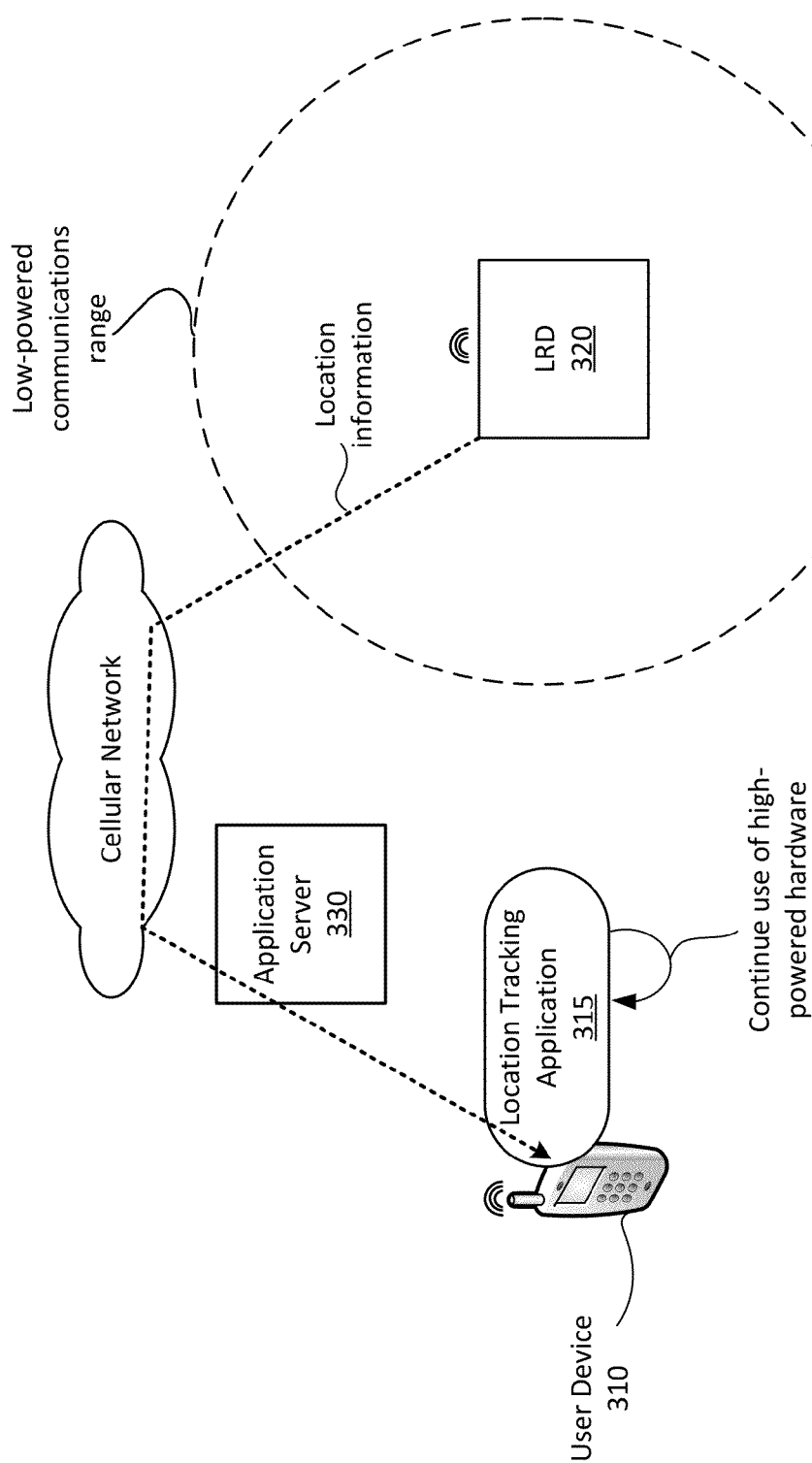
FIGS. 9-12 illustrate an example implementation for reducing power consumption by a location reference device while permitting a user device to continuously track the location of the location reference device.

FIGS. 9-12 illustrate example implementations for controlling hardware on LRD 320 to reduce power consumption by LRD 320 while permitting user device 310 to continuously track the location of LRD 320. In FIG. 9, LRD 320 may determine its location using high-powered location identification hardware (e.g., when user device 310 is outside of a low-powered communications range of LRD 320). As shown in FIG. 9, LRD 320 may output its location information to user device 310 using high-powered communications hardware. For example, LRD 320 may output its location information via a cellular network, accessible using the high-powered communications hardware. LRD 320 may output its location information user device 310 (e.g., via application server 330) so that user device 310 can track the location of LRD 320. LRD 320 may output its location information to user device 310 when user device 310 is outside of a low-powered communications range of LRD 320. Location tracking application 315 may be implemented as part of user device 310, and may monitor the location of LRD 320 relative to user device 310. LRD 320 may determine that LRD 320 should continue use of high-powered hardware (e.g., since user device 310 is outside of the low-powered communications range of LRD 320).

Figure 10:
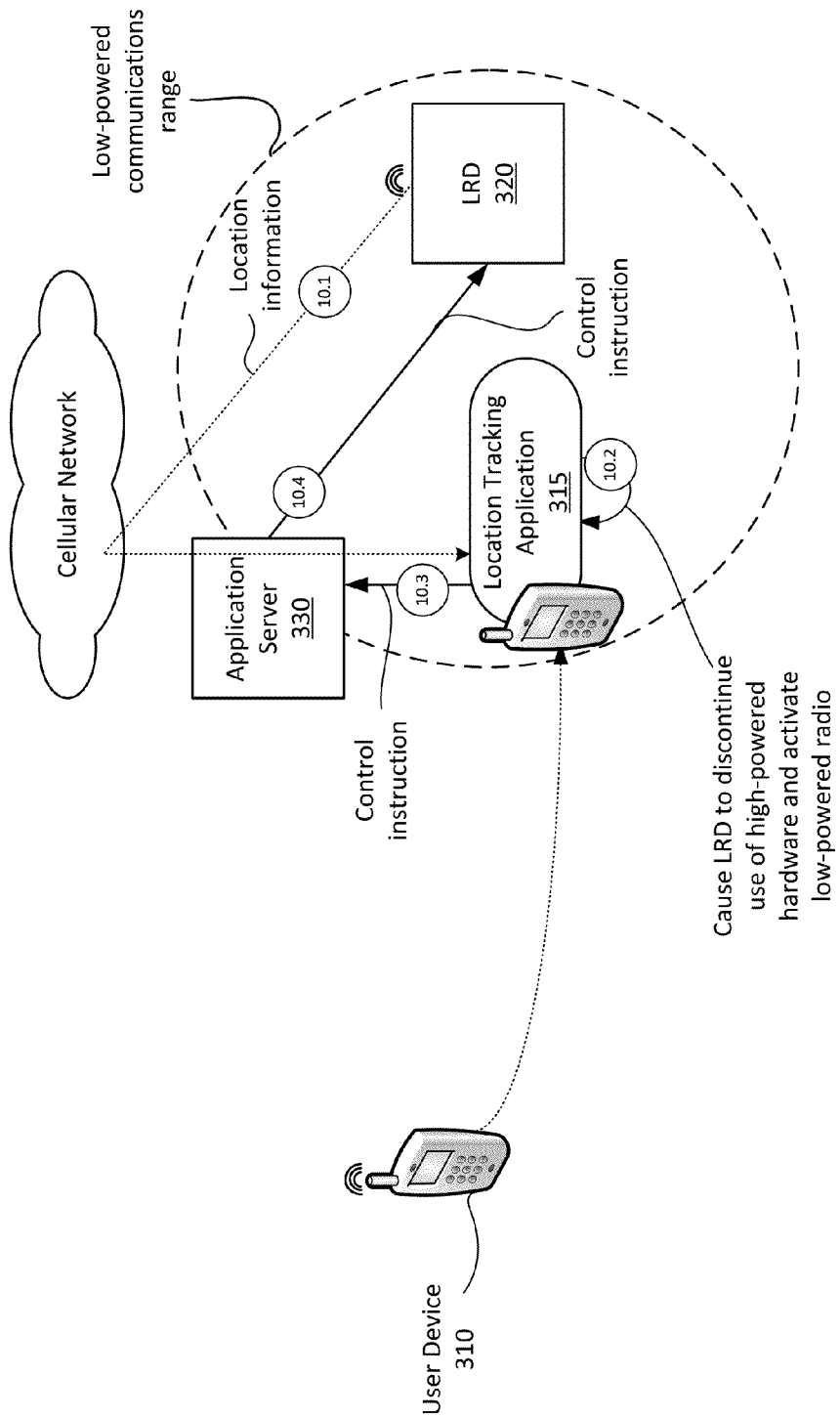

Referring to FIG. 10, LRD 320 may output its location information to LRD 320 (arrow 10.1) using high-powered hardware. When user device 310 moves to within a low-powered communications range of LRD 320 (or when LRD 320 moves to within a low-powered communications range of user device 310), location tracking application 315 may generate a control instruction to direct LRD 320 to discontinue use of high-powered hardware (arrow 10.2). Location tracking application 315 may output the control instruction LRD 320 via application server 330 (arrows 10.3 and 10.4).

Figure 11:
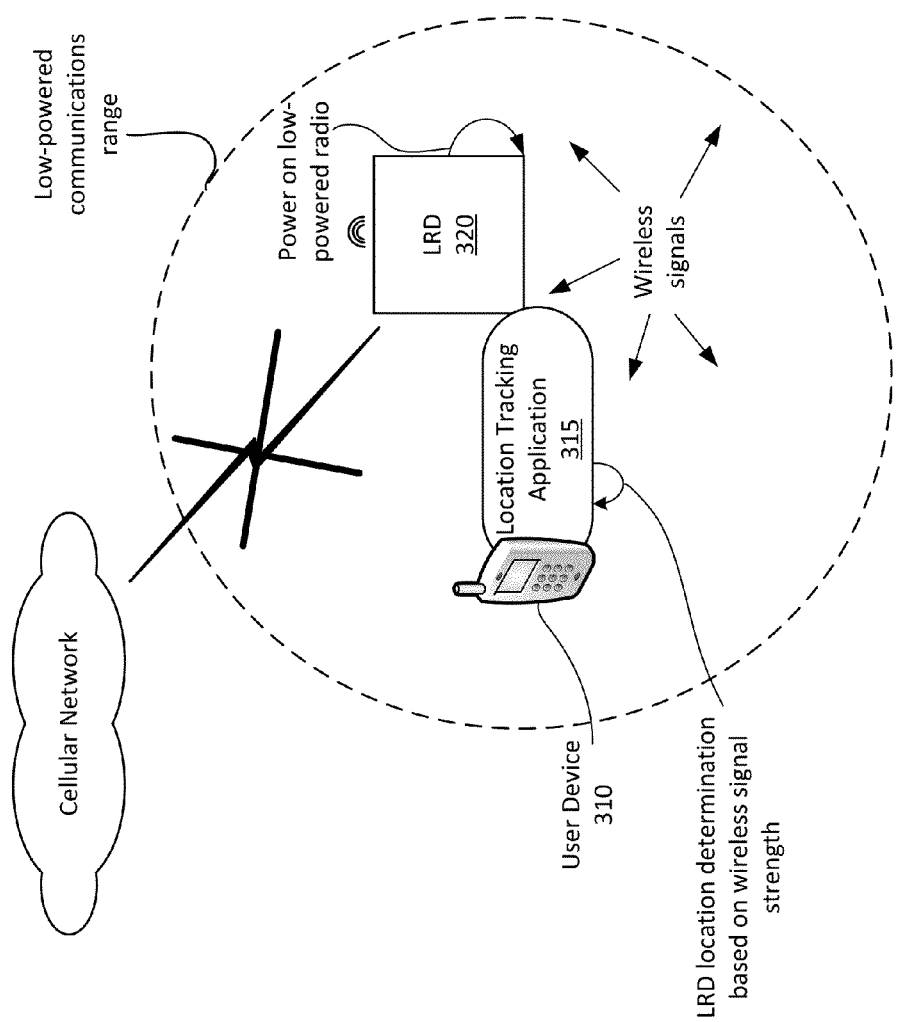

Referring to FIG. 11, LRD 320 may discontinue use of high-powered hardware, and may hence discontinue communications with the cellular network (e.g., communications for reporting the location of LRD 320), thereby reducing power consumption by LRD 320. LRD 320 may instead output wireless signals via low-powered communications hardware (e.g., wireless signals that may be received by user device 310 when user device 310 is within the low-powered communications range). Based on the strength of the received wireless signals, location tracking application 315 may determine the location of LRD 320 without the need for LRD 320 to determine its own location or report its location information using high-powered location determination hardware. As a result, user device 310 may continue to track the location of LRD 320 even after LRD 320 discontinues the use of high-powered hardware.

Figure 12:
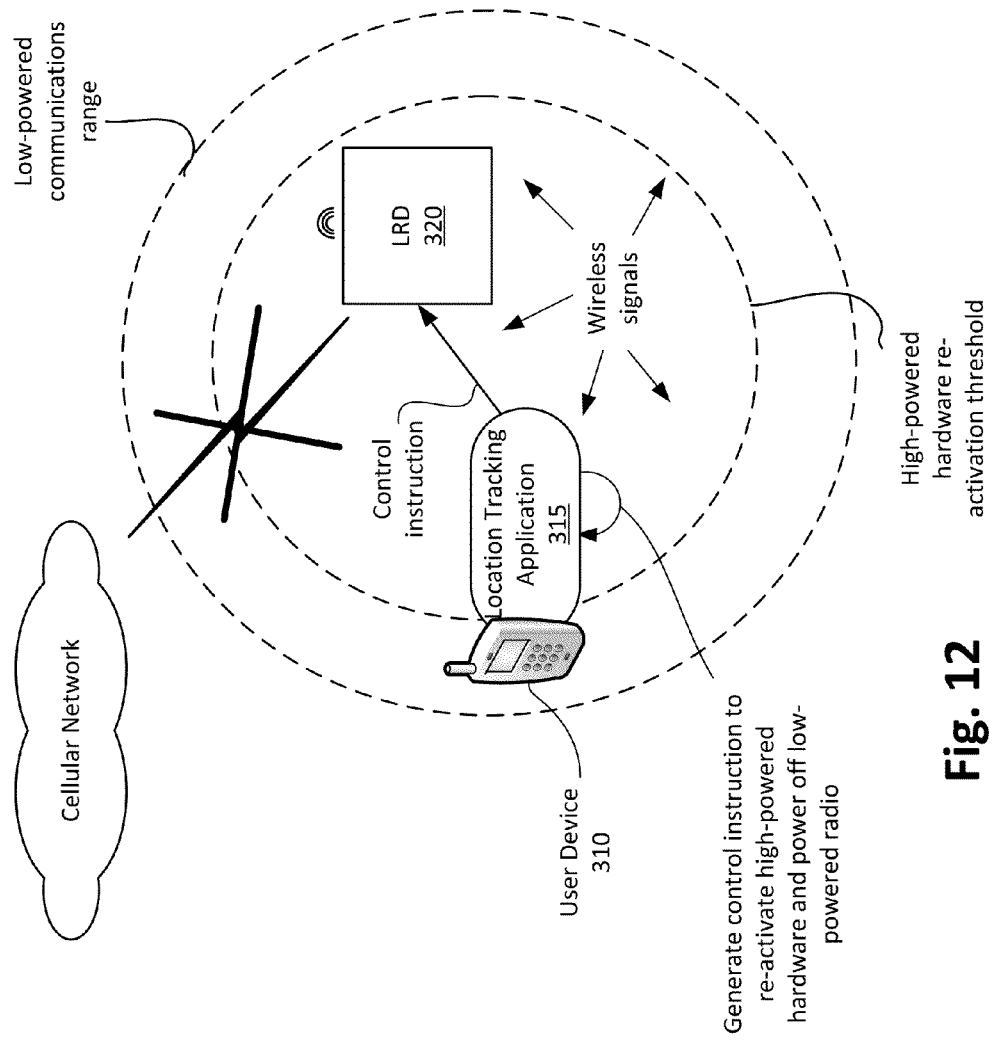

Referring to FIG. 12, location tracking application 315 may generate a control instruction to direct LRD 320 to re-activate high-powered hardware when user device 310 is located within a low-powered communications range, but outside a threshold range in which the high-powered hardware should be reactivated (e.g., a high-powered hardware re-activation threshold). In some implementations, location tracking application 315 may generate the control instruction when the signal strength of wireless signals, output by low-powered hardware of LRD 320 and received by user device 310, drops below a particular threshold (e.g., indicating that user device 310 is still located within the low-powered communications range, but is outside of the high-powered hardware re-activation threshold range).

Location tracking application 315 may output the control instruction to direct LRD 320 (e.g., via application server 330 or directly to LRD 320 via the lower powered communications hardware) to reactivate high-powered hardware. LRD 320 may then determine the location of LRD 320 using high-powered location detection hardware, and output this location information to user device 310 using high-powered communications hardware (e.g., to permit user device 310 to continue tracking LRD 320 when LRD 320 is no longer within a low-powered communications range of user device 310). If user device 310 continues to receive wireless signals after LRD 320 has re-activated high powered hardware, and if the signal strength of wireless signals outputted by the low-powered hardware of LRD 320 rises above a particular threshold, location tracking application 315 may direct LRD 320 to again deactivate the high powered hardware.

Figure 13:
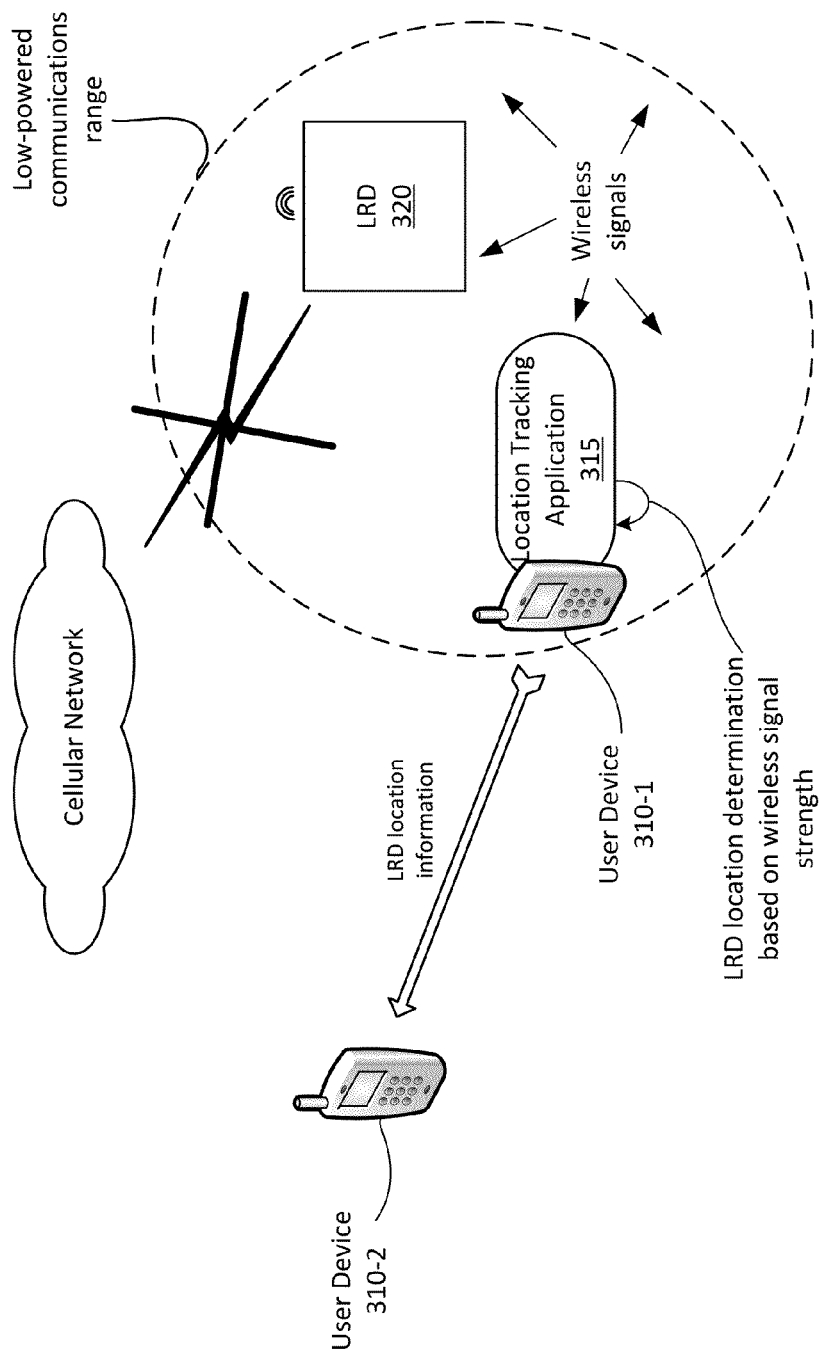
FIG. 13 illustrates an example implementation for tracking the location of a location reference device via crowd-sourcing techniques.

FIG. 13 illustrates an example implementation for tracking the location of an LRD via crowd-sourcing techniques. As shown in FIG. 13, a first user device 310 (e.g., user device 310-1), may determine the location of LRD 320 based on wireless signals output by LRD 320 via low-powered hardware (e.g., when user device 310-1 is located within a low-powered communications range of LRD 320, and when high-powered hardware of LRD 320 is inactive). User device 310-1 may then output location information of LRD 320 to a second user device 310 (e.g., user device 310-2) that is outside of the low-powered communications range of LRD 320. As a result, user device 310-2 may track the location of LRD 320 when user device 310-2 is outside of the low-powered communications range and when high-powered hardware of LRD 320 is inactive.

Figure 14:
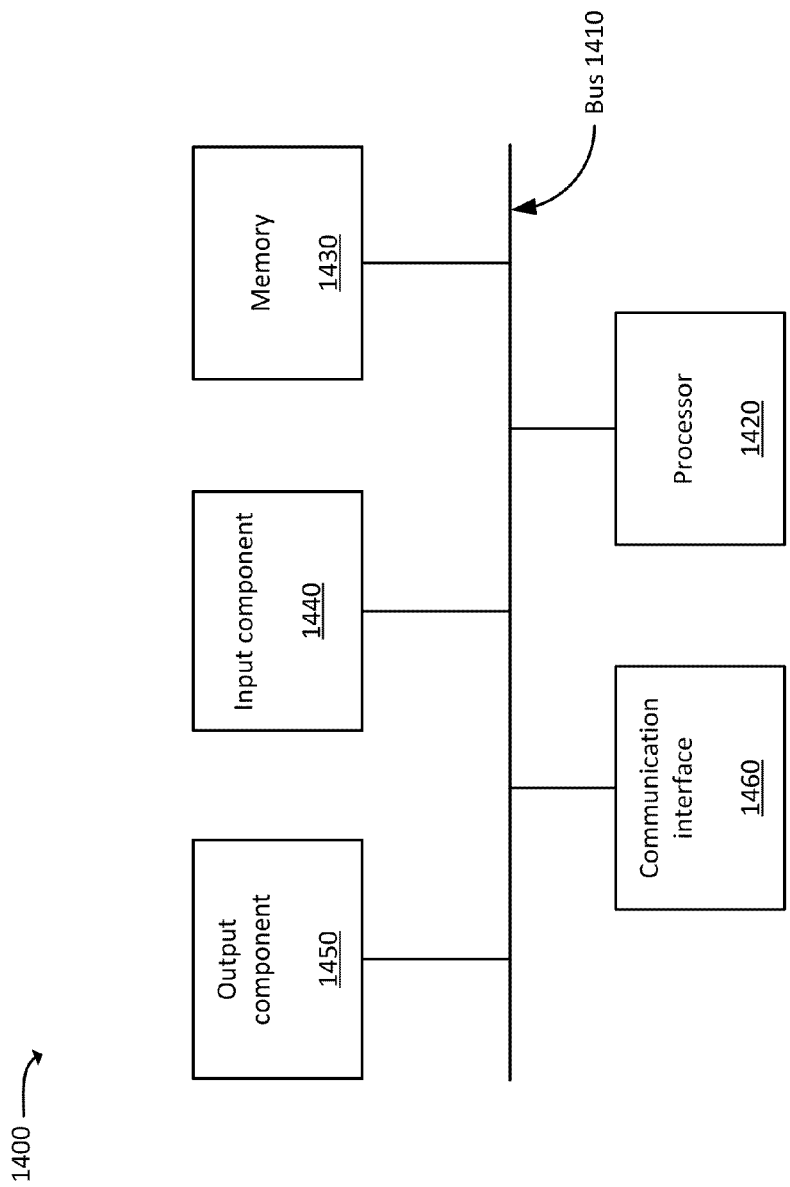
FIG. 14 illustrates example components of one or more devices, according to one or more implementations described herein.

FIG. 14 is a diagram of example components of device 1400. One or more of the devices described above (e.g., with respect to FIGS. 1, 2, 3A, 3B, 7, and, and 9-13) may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes (LEDs), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 4-6 and 8, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, 3A, 3B, 7, and, and 9-13), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   requesting, by a user device, location information for a location reference device (LRD);
   receiving, by the user device and based on the request, the location information for the LRD via a cellular network connection;
   transmitting, by the user device and via the cellular network connection, an instruction to direct the LRD to activate a non-cellular radio on the LRD;
   receiving, by the user device, wireless signals outputted via the non-cellular radio;
   determining, by the user device, a distance between the user device and the LRD based on a strength of the wireless signals received by the user device; and
   audibly or visually indicating, by the user device, the determined distance between the user device and the LRD.

2. The method of claim 1, wherein requesting the location information for the LRD includes transmitting, towards the LRD and via the cellular network connection, a wake command to wake the LRD from a low-powered mode.

3. The method of claim 1, wherein receiving the location information includes receiving the location information as a coarse location.

4. The method of claim 1, wherein the non-cellular radio includes a short-range radio.

5. The method of claim 1, further comprising:
   receiving a request from a user of a user device to receive a fine location of the LRD,
   wherein transmitting the instruction to direct the LRD to activate the non-cellular radio on the LRD is based on receiving the request from the user.

6. The method of claim 1, further comprising:
   determining that the user device is within a threshold distance of the LRD,
   wherein transmitting the instruction to direct the LRD to activate the non-cellular radio on the LRD is based on determining that the user device is within the threshold distance of the LRD.

7. The method of claim 1, further comprising:
   disabling the non-cellular radio after determining the distance between the user device and the LRD.

8. The method of claim 7, further comprising:
   receiving an indication, from a user of the user device, that the LRD has been found,
   wherein disabling the non-cellular radio is based on receiving the indication that the LRD has been found.

9. A system comprising:
   a user device, comprising:
     a non-transitory memory device storing:
     a plurality of processor-executable instructions; and
     a processor configured to execute the processor-executable instructions, wherein executing the processor-executable instructions causes the processor to:
       request location information for a location reference device (LRD);
       receive, based on the request, the location information for the LRD via a cellular network;
       transmit, via the cellular network, an instruction to direct the LRD to activate a non-cellular radio on the LRD;
       receive wireless signals outputted via the non-cellular radio;
       determine a distance between the user device and the LRD based on a strength of the wireless signals received by the user device; and
       audibly or visually indicate, by the user device, the determined distance between the user device and the LRD.

10. The system of claim 9, wherein executing the processor-executable instructions, to request the location information for the LRD, causes the processor to:
    transmit, towards the LRD and via the cellular network, a wake command to wake the LRD from a low-powered mode.

11. The system of claim 9, wherein executing the processor-executable instructions, to receive the location information, causes the processor to:
    receive the location information as a coarse location.

12. The system of claim 9, wherein the non-cellular radio includes a short-range radio.

13. The system of claim 9, wherein executing the processor-executable instructions further causes the processor to:
    receive a request from a user of a user device to receive a fine location of the LRD,
    wherein executing the processor-executable instructions, to transmit the instruction to direct the LRD to activate a non-cellular radio on the LRD, causes the processor to transmit the instruction to direct the LRD based on receiving the request from the user.

14. The system of claim 9, wherein executing the processor-executable instructions further causes the processor to:
    determine that the user device is within a threshold distance of the LRD,
    wherein executing the processor-executable instructions, to transmit the instruction to direct the LRD to activate a non-cellular radio on the LRD, causes the processor to transmit the instruction to direct the LRD based on determining that the user device is within the threshold distance of the LRD.

15. The system of claim 9, wherein executing the processor-executable instructions further causes the processor to:
    disable the non-cellular radio after determining the distance between the user device and the LRD.

16. The system of claim 15, wherein executing the processor-executable instructions further causes the processor to:
    receive an indication, from a user of the user device, that the LRD has been found,
    wherein executing the processor-executable instructions, to disable the non-cellular radio, causes the processor to disable the non-cellular radio based on receiving the indication that the LRD has been found.

17. A non-transitory computer readable medium, comprising processor-executable instructions to cause a processor to:
    request location information for a location reference device (LRD);
    receive, based on the request, the location information for the LRD via a cellular network connection;
    transmit, via the cellular network connection, an instruction to direct the LRD to activate a non-cellular radio on the LRD;
    receive wireless signals outputted via the non-cellular radio;
    determine a distance between a user device and the LRD based on a strength of the wireless signals received by the user device; and
    audibly or visually indicate the determined distance between the user device and the LRD.

18. The non-transitory computer readable medium of claim 17, wherein to request the location information for the LRD, the processor-executable instructions cause the processor to transmit, towards the LRD and via the cellular network connection, a wake command to wake the LRD from a low-powered mode.

19. The non-transitory computer readable medium of claim 17, wherein:
- the processor-executable instructions cause the processor to receive a request, from a user of the user device, to receive a fine location of the LRD, and the transmission of the instruction to direct the LRD to activate the non-cellular radio on the LRD is based on receiving the request from the user.

20. The non-transitory computer readable medium of claim 17, wherein:
- the processor-executable instructions cause the processor to determine that the user device is within a threshold distance of the LRD, and
- the transmission of the instruction to direct the LRD to activate the non-cellular radio on the LRD is based on a determination that the user device is within the threshold distance of the LRD.

* * * * *